United States Patent
Maeda

(10) Patent No.: US 11,064,069 B2
(45) Date of Patent: Jul. 13, 2021

(54) COMMUNICATION APPARATUS, COMMUNICATION DATA RECORDING SYSTEM, COMMUNICATION METHOD, AND PROGRAM

(71) Applicant: NEC Platforms, Ltd., Kawasaki (JP)

(72) Inventor: Kazuhiro Maeda, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/489,899

(22) PCT Filed: Nov. 30, 2018

(86) PCT No.: PCT/JP2018/044118
§ 371 (c)(1),
(2) Date: Aug. 29, 2019

(87) PCT Pub. No.: WO2019/111810
PCT Pub. Date: Jun. 13, 2019

(65) Prior Publication Data
US 2020/0236215 A1 Jul. 23, 2020

(30) Foreign Application Priority Data
Dec. 5, 2017 (JP) .............................. JP2017-233466

(51) Int. Cl.
*H04M 3/42* (2006.01)
*H04M 1/253* (2006.01)
(Continued)

(52) U.S. Cl.
CPC ..... *H04M 3/42221* (2013.01); *H04M 1/2535* (2013.01); *H04M 7/0081* (2013.01);
(Continued)

(58) Field of Classification Search
CPC ........... H04M 3/42221; H04M 1/2525; H04M 7/0081; H04M 11/10; H04M 15/56; H04M 2203/301; H04M 1/2535
(Continued)

(56) References Cited

U.S. PATENT DOCUMENTS 5,960,400 A * 9/1999 Bremer ................. H04B 1/662
704/500
8,428,559 B2 * 4/2013 Silva ................... H04L 12/1831
455/412.1
(Continued)

FOREIGN PATENT DOCUMENTS

CN 104869106 A 8/2015
CN 105376144 A 3/2016
(Continued)

OTHER PUBLICATIONS

JPO Office Action for Application No. 2017-233466 dated Nov. 20, 2018.
(Continued)

*Primary Examiner* — Binh Kien Tieu

(57) ABSTRACT

The present invention provides an IP telephone and the like capable of preventing a loss of the beginning part of a talk. A communication apparatus according to the present invention includes: a memory (110) configured to store communication data with a communication destination; and a control unit (120) configured to transmit and receive the communication data to and from the communication destination in each first duration and store the transmitted and received communication data in the memory (110), then output, after a communication session with an external recording apparatus that records the communication data is established, the communication data stored in the memory
(Continued)

(110) to the external recording apparatus in each second duration that is shorter than the first duration.

16 Claims, 7 Drawing Sheets

(51) Int. Cl.
 *H04M 7/00* (2006.01)
 *H04M 11/10* (2006.01)
 *H04M 15/00* (2006.01)
(52) U.S. Cl.
 CPC .......... *H04M 11/10* (2013.01); *H04M 15/56* (2013.01); *H04M 2203/301* (2013.01)
(58) Field of Classification Search
 USPC .......... 379/68, 73, 82, 85, 87; 704/500, 501, 704/503, 50, 200, 211, 212, 205
 See application file for complete search history.

(56) References Cited

U.S. PATENT DOCUMENTS

| | | | |
|---|---|---|---|
| 9,369,570 B1* | 6/2016 | Kolodizner | H04M 3/2236 |
| 9,413,880 B1* | 8/2016 | Wolfeld | H04M 7/0084 |
| 10,565,851 B2* | 2/2020 | Hodge | G08B 21/22 |
| 10,565,854 B2* | 2/2020 | Kitada | G08B 21/0275 |
| 2001/0041559 A1 | 11/2001 | Salabaschew | |
| 2002/0155847 A1* | 10/2002 | Weinberg | H04M 3/42221 |
| | | | 455/456.1 |
| 2003/0032447 A1 | 2/2003 | Bulthuis | |
| 2003/0179719 A1* | 9/2003 | Kobayashi | H04L 47/26 |
| | | | 370/282 |
| 2004/0137945 A1* | 7/2004 | Takagi | H04M 3/42221 |
| | | | 455/558 |
| 2005/0129186 A1* | 6/2005 | Dabush-Dorel | G06F 3/16 |
| | | | 379/67.1 |
| 2008/0034163 A1* | 2/2008 | Dong | G06F 12/0806 |
| | | | 711/130 |
| 2008/0059640 A1* | 3/2008 | Oka | H04L 67/34 |
| | | | 709/228 |
| 2010/0085987 A1* | 4/2010 | Kamata | H04W 28/06 |
| | | | 370/477 |
| 2011/0250870 A1 | 10/2011 | Silva | |
| 2011/0273978 A1* | 11/2011 | Murayama | H04L 12/4015 |
| | | | 370/216 |
| 2012/0054382 A1 | 3/2012 | Kung | |
| 2015/0156325 A1* | 6/2015 | Miyazawa | H04L 43/087 |
| | | | 379/202.01 |
| 2015/0381818 A1 | 12/2015 | Kaplan et al. | |

FOREIGN PATENT DOCUMENTS

| | | |
|---|---|---|
| CN | 106303644 A | 1/2017 |
| CN | 107395904 A | 11/2017 |
| JP | 2001-056696 A | 2/2001 |
| JP | 2004-221844 A | 8/2004 |
| JP | 2007-019767 A | 1/2007 |
| JP | 2007-081526 A | 3/2007 |
| JP | 2008-092158 A | 4/2008 |

OTHER PUBLICATIONS

International Search Report for PCT/JP2018/044118 dated Jan. 8, 2019 [PCT/ISA/210].
Communication dated Jan. 8, 2020, issued by the European Patent Office in application No. 18885726.2.
Communication dated Jul. 31, 2020, from the State Intellectual Property Office of the P.R.C. in application No. 201880014830.6.

* cited by examiner

COMMUNICATION APPARATUS, COMMUNICATION DATA RECORDING SYSTEM, COMMUNICATION METHOD, AND PROGRAM

CROSS REFERENCE TO RELATED APPLICATIONS

This application is a National Stage of International Application No. PCT/JP2018/044118, filed on Nov. 30, 2018, which claims priority from Japanese Patent Application No. 2017-233466, filed on Dec. 5, 2017, the contents of all of which are incorporated herein by reference in their entirety.

TECHNICAL FIELD

The present invention relates to a communication apparatus, a communication data recording system, a communication method, and a program.

BACKGROUND ART

Internet Protocol (IP) telephones using Voice over Internet Protocol (VoIP) technology are widely used. Various proposals have been made for appropriately detecting, transmitting and receiving, when a communication session is established so that IP telephones can communicate with each other and transmit and receive a voice, the beginning of a talk immediately after the communication session has been established.

Patent Literature 1 discloses an apparatus that accumulates input voices in a ring buffer and converts a talk speed converter when a voice detection unit detects a voice activity. The talk speed converter starts, under the control of a talk speed control unit, reproduction from the accumulated voices at a time before a certain time, quickly reproduces the beginning part of the accumulated voices, and converts the talk speed so that the beginning part is reproduced at a constant speed when keeping up with the input voice.

Patent Literature 2 discloses an IP telephone that prevents a loss of the beginning part of a transmission voice immediately after the start of a call. The IP telephone includes a buffer memory that performs FIFO (first—in, first—out) of an RTP packet including a transmission voice or a reception voice, and an MPU that controls transmission and reception of the RTP packet with the IP network. The MPU writes the RTP packet including the transmission voice into the buffer memory until a call session is established. Until a predetermined time has elapsed from the establishment of the call session, the MPU writes the RTP packet including the transmission voice into the buffer memory and reads the RTP packet, which has been written into the buffer memory, in the ascending order of the written date, then sends the read packet to the IP network. After a predetermined time has elapsed from the establishment of the call session, the MPU controls the buffer memory as a jitter buffer.

Patent Literature 3 discloses control means for preventing a loss of the beginning part of a talk from effecting a call. Communication control means of the telephone apparatus starts, after the operation for responding to an incoming call from the telephone apparatus at the other end, processing for recording by voice recording means, the voice being input from a transmitter as a recorded voice. The control means starts processing for quickly reproducing the recorded voice by voice reproduction means and sending it to a communication path in response to the subsequent establishment of the communication path with the telephone apparatus at the other end. Then, the control means stops the recording by the voice recording means in response to the end of the transmission of the recorded voice data, and sends the voice input from the transmitter to the communication path.

CITATION LIST

Patent Literature

Patent Literature 1: Japanese Unexamined Patent Application Publication No. 2001-056696
Patent Literature 2: Japanese Unexamined Patent Application Publication No. 2007-019767
Patent Literature 3: Japanese Unexamined Patent Application Publication No. 2008-092158

SUMMARY OF INVENTION

Technical Problem

Incidentally, an IP telephone call recording system for recording a call of an IP telephone is known. The IP telephone call recording system includes an IP telephone that transmits a call voice to a server and a recording server that records the call voice received from the IP telephone. It is expected that such a system will accurately record the beginning of a talk immediately after a call session has been established as with a call between IP telephones. That is, it is expected that the system will accurately record the beginning of a talk after the IP telephone transmits a request to start recording to the recording server. However, it is difficult for the techniques disclosed in the above-mentioned Patent Literature to be adapted to the case in which a response from the recording server is delayed.

An object of the present disclosure has been made in view of the aforementioned problems and aims to provide an IP telephone and the like capable of preventing a loss of the beginning part of a talk.

Solution to Problem

A first communication apparatus according to the present invention includes:
a memory configured to store communication data with a communication destination; and
a control unit configured to transmit and receive the communication data to and from the communication destination in each first duration and store the transmitted and received communication data in the memory, then output, after a communication session with an external recording apparatus that records the communication data is established, the communication data stored in the memory to the external recording apparatus in each second duration that is shorter than the first duration.

A second communication method according to the present invention includes:
transmitting and receiving communication data to and from a communication destination in each first duration;
storing the transmitted and received communication data in a memory;
establishing a communication session with an external recording apparatus that records the communication data; and
outputting, after the communication session with the external recording apparatus is established, the communication data stored in the memory to the external recording apparatus in each second duration that is shorter than the first duration.

A third program according to the present invention is a program for causing a computer to execute a communication method for causing an external recording apparatus to output communication data with a communication destination, the communication method including:

transmitting and receiving communication data to and from a communication destination in each first duration;

storing the transmitted and received communication data in a memory;

establishing a communication session with an external recording apparatus that records the communication data; and outputting, after the communication session with the external recording apparatus has been established, the communication data stored in the memory to the external recording apparatus in each second duration that is shorter than the first duration.

Advantageous Effects of Invention

According to the present invention, it is possible to provide an IP telephone and the like capable of preventing a loss of the beginning part of a talk.

DESCRIPTION OF EMBODIMENTS

Example Embodiment

Hereinafter, example embodiments of the present invention will be described with reference to the drawings.

Figure 1A:
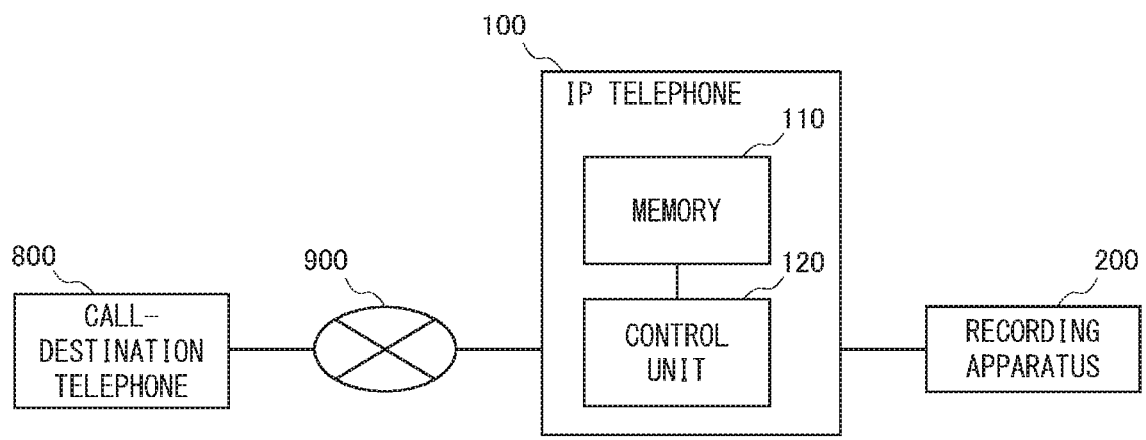
FIG. 1A is a block diagram of an IP telephone according to an example embodiment.

First, an outline of an IP telephone according to the example embodiment is described with reference to FIGS. 1A and 1B. FIG. 1A is a block diagram of the IP telephone according to the example embodiment. The IP telephone 100 is a communication apparatus that connects to an Internet network 900 and transmits and receives, using VoIP technology, communication data to and from a call-destination telephone 800 which is a communication destination. The communication data includes transmission data which is data of a voice uttered by a user of the IP telephone 100, and reception data received from the call-destination telephone 800.

The IP telephone 100 transmits and receives communication data in accordance with a predetermined communications protocol. For example, the IP telephone 100 processes 40 milliseconds of voice data into one communication packet and transmits the processed transmission data to the call-destination telephone 800 at intervals of 40 milliseconds. Further, the IP telephone 100 receives the transmission data that 40 milliseconds of voice data has been processed into one communication packet from the call-destination telephone 800 at intervals of 40 milliseconds.

Further, the IP telephone 100 connects to a recording apparatus 200 which is an external apparatus, and outputs communication data thereto. The IP telephone 100 and the recording apparatus 200 are connected to each other, for example, by a LAN (Local Area Network).

The IP telephone 100 includes a memory 110 and a control unit 120. The memory 110 stores communication data communicated with the call-destination telephone 800 in accordance with an instruction of the control unit 120. The control unit 120 transmits and receives the communication data to and from the call-destination telephone 800 and stores the communication data corresponding to a predetermined duration in the memory 110. Further, the control unit 120 outputs the communication data stored in the memory 110 to the recording apparatus 200. The control unit 120 outputs the communication data to the external recording apparatus in each predetermined duration. The predetermined duration is a duration of 40 milliseconds, which is a duration for transmitting and receiving communication data between the IP telephone 100 and the call-destination telephone 800, or a duration shorter than that (e.g., 20 milliseconds, 10 milliseconds).

Figure 1B:
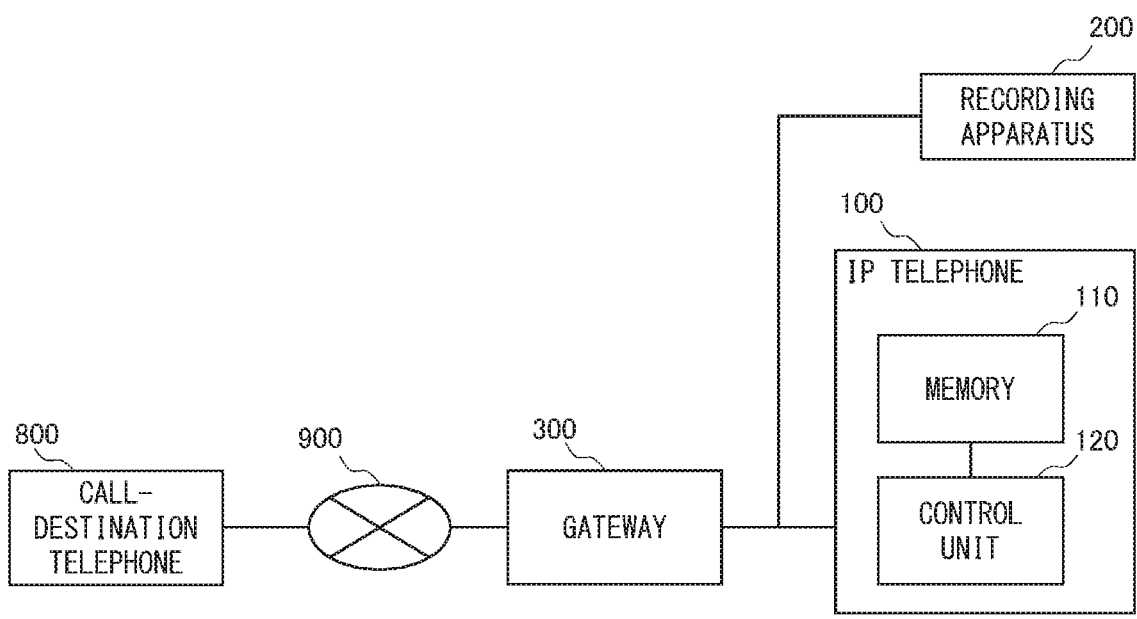
FIG. 1B is a block diagram of a modified example of the IP telephone according to the example embodiment.

FIG. 1B is a block diagram of a modified example of the IP telephone according to the example embodiment. As illustrated in FIG. 1B, the IP telephone 100 and the recording apparatus 200 may be connected to the Internet network 900 through a gateway 300. The gateway 300 is an apparatus that performs a relay between the Internet network 900, and the IP telephone 100 and the recording apparatus 200. The gateway 300 connects to a plurality of IP telephones or a plurality of recording apparatuses, and appropriately performs a relay between each of the connected telephones or apparatuses and the Internet network 900.

Figure 2:
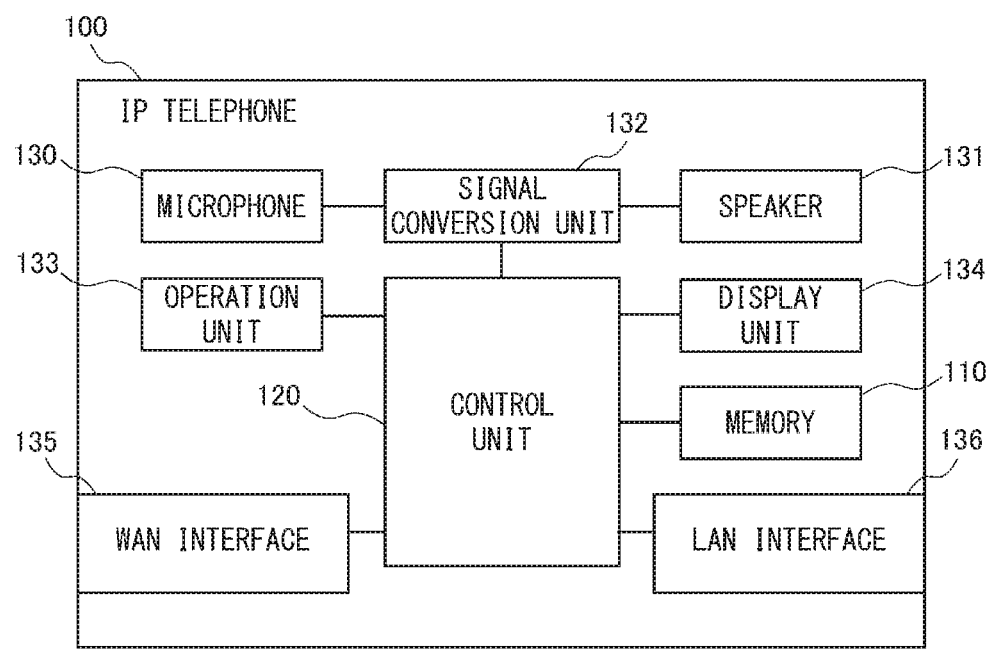
FIG. 2 shows an example of a hardware configuration of the IP telephone.

Next, details of the IP telephone 100 are described with reference to FIG. 2. FIG. 2 shows an example of a hardware configuration of the IP telephone. The IP telephone 100 mainly includes the memory 110, the control unit 120, a microphone 130, a speaker 131, a signal conversion unit 132, an operation unit 133, a display unit 134, a WAN interface 135, and a LAN interface 136.

The memory 110 is a volatile or non-volatile storage device connected to the control unit 120. The memory 110 is composed of, for example, a Dynamic Random Access Memory (DRAM), a Synchronous Dynamic Random Access Memory (SDRAM), a flash memory, a Hard Disk Drive (HDD), or a combination thereof.

The control unit 120 connects to each of the components of the IP telephone 100 and has a function of controlling each of the units. The control unit 120 is, for example, an arithmetic unit such as a micro processing unit (MPU), and may be composed of one chip, or a plurality of chips connected to each other.

The microphone 130 detects voice uttered by a user and generates voice data. The speaker 131 converts voice data included in reception data into a voice and conveys the voice to a user. The signal conversion unit 132 converts an analog signal of the microphone 130 into voice data which is a digital signal, and converts voice data which is a digital signal included in reception data from a digital signal into an analog signal, then outputs them to the speaker 131.

The operation unit 133 includes a plurality of input devices such as buttons, thereby having a function of receiving an operation when a user calls the call-destination telephone 800 or an operation when a user answers an incoming call from the call-destination telephone 800.

The display unit 134 includes, for example, a liquid crystal display apparatus, and has a function of displaying the telephone number of the call-destination telephone 800 to be called, the telephone number of the incoming call, and the like.

The WAN interface 135 corresponds to a wide area network (WAN) for connecting to the Internet network 900, and has a specification, for example, for performing communication in conformity with Session Initiation Protocol (SIP), which is a communications protocol of an IP telephone. The WAN interface 135 may include, for example, a connector for transmitting and receiving a signal to and from the outside, and a PHYsical Layer Chip (PHY) that converts a signal to be transmitted and received into a predetermined form.

The LAN interface 136 corresponds to a LAN for connecting to the recording apparatus 200, and has a specification for transmitting and receiving a signal to and from the recording apparatus 200. The LAN interface 136 may include, for example, a connector for transmitting and receiving a signal to and from the recording apparatus 200, and a PHYsical Layer Chip (PHY) that converts a signal to be transmitted and received into a predetermined form.

Figure 3:
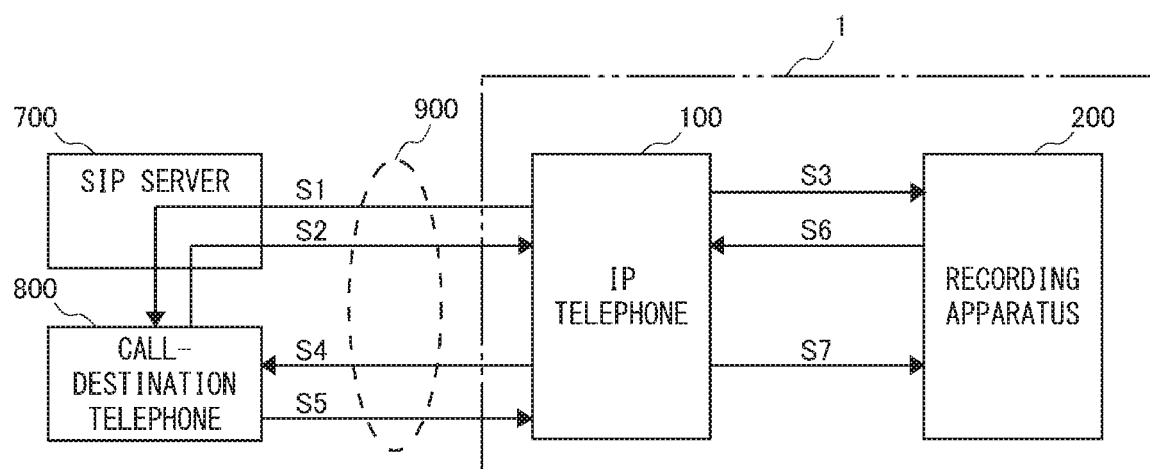
FIG. 3 shows a signal flow in an IP telephone recording system.

Next, a signal flow of an IP telephone recording system including the IP telephone 100 and the recording apparatus 200 is described with reference to FIG. 3. FIG. 3 shows the signal flow in the IP telephone recording system. An IP telephone recording system 1 includes the IP telephone 100 and the recording apparatus 200. The recording apparatus 200 has a function of communicably connecting to the IP telephone 100 and recording communication data output from the IP telephone 100. The recording apparatus 200 includes, for example, a non-volatile recording apparatus such as an HDD, a Solid State Drive (SSD), an optical disk, or a magnetic tape.

In FIG. 3, first, the IP telephone 100 transmits an outgoing message including the telephone number of the call-destination telephone 800 to an SIP server 700 through the Internet network 900, in order to achieve a call with the call-destination telephone 800. The SIP server 700 transfers the outgoing message from the IP telephone 100 to the call-destination telephone 800 (Step S1).

The call-destination telephone 800 which has received the outgoing message sends a response message to the SIP server 700, and the SIP server 700 transfers the response message to the IP telephone 100 which is the call originator (Step S2). When the IP telephone 100 receives the response message from the SIP server 700, a communication session between the IP telephone 100 and the call-destination telephone 800 is established.

When a communication session between the IP telephone 100 and the call-destination telephone 800 is established, the IP telephone 100 subsequently attempts to establish a communication session with the recording apparatus 200. The IP telephone 100 transmits a request signal for establishing a communication session to the recording apparatus 200 (Step S3).

The IP telephone 100 transmits a request signal to the recording apparatus 200 and starts a call with the call-destination telephone 800 in which the communication session has been established (Step S4). Further, the call-destination telephone 800 starts a call with the IP telephone 100 in which the communication session has been established (Step S5).

Next, the recording apparatus 200 transmits, to the IP telephone 100, a response signal to the request signal received from the IP telephone 100 (Step S6).

Subsequently, when the IP telephone 100 receives the response signal from the recording apparatus 200, a communication session between the IP telephone 100 and the recording apparatus 200 is established. When a communication session between the IP telephone 100 and the recording apparatus 200 is established, the IP telephone 100 outputs communication data including transmission data and reception data to the recording apparatus 200 (Step S7).

The IP telephone recording system 1 has the signal flow described above. According to the above-described example, the timing at which the communication session between the IP telephone 100 and the call-destination telephone 800 is established is earlier than the timing at which the communication session between the IP telephone 100 and the recording apparatus 200 is established. Consequently, if no communication data between the IP telephone 100 and the call-destination telephone 800 is stored before the communication session between the IP telephone 100 and the recording apparatus 200 is established, a loss of the beginning part of the communication data recorded in the recording apparatus occurs. Therefore, the IP telephone 100 records communication data in the memory 110 and outputs the recorded communication data to the recording apparatus 200.

Figure 4:
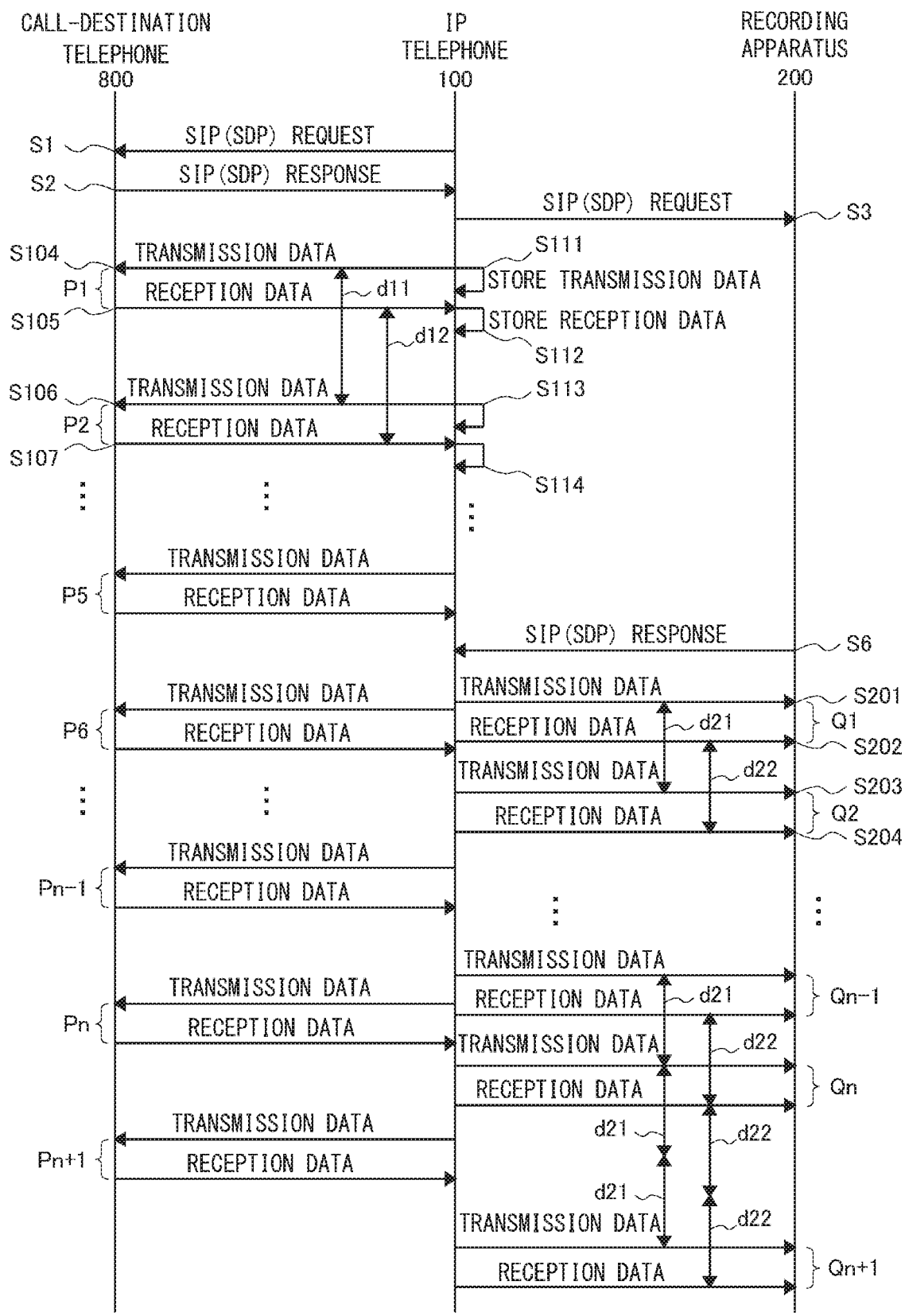
FIG. 4 is a sequence diagram illustrating processing for the IP telephone recording system.

Next, details of processing of communication data in the IP telephone recording system 1 is described with reference to FIG. 4. FIG. 4 is a sequence diagram illustrating the processing of the IP telephone recording system. FIG. 4 shows an example of processing for establishing a communication session between the IP telephone 100 and the call-destination telephone 800 and transmitting communication data to the recording apparatus 200.

First, as shown in FIG. 3, the IP telephone 100 transmits a request signal to the call-destination telephone 800 in order to establish a communication session with the call-destination telephone 800 (Step S1). More specifically, the IP telephone 100 negotiates, by using a Session Description Protocol (SDP) in a SIP packet, a type of communication data, a coding system, a transmission cycle of a voice packet, and the like to establish a communication session. Note that the IP telephone 100 negotiates, for example, a communication session in conformity with a real-time transport protocol (RTP) which is a protocol for transmitting voice data in real time.

Next, as shown in FIG. 3, the call-destination telephone 800 transmits, to the IP telephone 100, a response signal to the request signal transmitted from the IP telephone 100 (Step S2). When the IP telephone 100 receives the response signal, a communication session between the IP telephone 100 and the call-destination telephone 800 is established.

Next, as shown in FIG. 3, the IP telephone 100 transmits a request signal to the recording apparatus 200 (Step S3). The IP telephone 100 again uses the SDP in the SIP packet in this step.

Next, the IP telephone 100 and the call-destination telephone 800 start transmission and reception of communication data (corresponding to Steps S4 and S5 in FIG. 3). The IP telephone 100 transmits transmission data to the call-destination telephone 800 (Step S104). Further, the IP telephone 100 receives reception data transmitted by the call-destination telephone 800 (Step S105). As for the transmission data, voice data that is a payload corresponding to a predetermined time is transmitted as one packet. Further, as for the reception data, like the transmission data, voice data that is a payload corresponding to a predetermined time is transmitted as one packet. The transmission data and the reception data are each transmitted or received in conformity with the RTP.

Next, after a duration d11 has elapsed from when the IP telephone 100 transmitted (Step S104) the transmission data in the previous time, it again transmits transmission data (Step S106). The duration d11 is a predetermined duration. Further, the duration d11 is equal to the time during which a voice of the voice data, which is the payload of the transmission data, is acquired. That is, the IP telephone 100 acquires a voice in each duration d11, and transmits voice data of the acquired voice to the call-destination telephone 800 in each duration d11.

Further, after a duration d12 has elapsed from when the IP telephone 100 received (Step S107) the reception data in the previous time, it again receives reception data (Step S105). The duration d12 is a predetermined duration. Further, the duration d12 is equal to the time during which a voice of the voice data, which is the payload of the reception data, is acquired. That is, the IP telephone 100 receives, in each duration d12, voice data of the voice acquired in each duration d12 from the call-destination telephone 800. Then, it outputs the received voice data to the speaker 131.

As described above, the IP telephone 100 continuously transmits transmission data and continuously receives reception data, thereby achieving a natural conversation with the call-destination telephone 800 without interruption.

Note that in FIG. 4, a first transmission of transmission data and a first reception of reception data are regarded as one pair, and the pair of the first transmission and reception is referred to as a P1. Similarly, a pair of a second transmission and reception is referred to as a P2, and hereinafter, a pair of an n-th transmission and reception is referred to as a Pn.

Incidentally, after a call between the IP telephone 100 and the call-destination telephone 800 is started, the IP telephone 100 transmits transmission data to the call-destination telephone 800 (Step S104) and stores the transmitted transmission data to the memory 110 (Step S111). Similarly, after the duration d11 has elapsed, the IP telephone 100 stores transmission data in the memory 110 (Step S113). Further, the IP telephone 100 stores the reception data received (Step S105) from the call-destination telephone 800 in the memory 110 (Step S112). Similarly, after the duration d12 has elapsed, the IP telephone 100 stores reception data in the memory 110 (step S114). From then on, the IP telephone 100 successively stores transmission data and reception data in the memory 110.

After a fifth transmission and reception P5, the IP telephone 100 receives a response signal from the recording apparatus 200 (Step S6). By receiving the response signal from the recording apparatus 200, a communication session is established between the IP telephone 100 and the recording apparatus 200.

Next, the IP telephone 100 outputs the transmission data stored in the memory 110 to the recording apparatus 200 (Step S201). Subsequently, the IP telephone 100 outputs the reception data stored in the memory 110 to the recording apparatus 200 (Step S202). Note that the transmission data transmitted in Step S201 is the one stored in the memory 110 in Step S111. Further, the reception data transmitted in Step S202 is the one stored in the memory 110 in Step S112.

Next, after a duration d21 has elapsed from when the IP telephone 100 output (Step S201) the transmission data to the recording apparatus 200 in the previous time, it again outputs transmission data to the recording apparatus 200 (Step S203). Subsequently, after a duration d22 has elapsed from when the IP telephone 100 output (Step S202) the reception data to the recording apparatus 200 in the previous time, it again outputs reception data to the recording apparatus 200 (Step S204). Note that the transmission data transmitted in Step S203 is the one stored in the memory 110 in Step S113. Further, the reception data transmitted in Step S204 is the one stored in the memory 110 in Step S114.

Note that in FIG. 4, a first output of transmission data and a first output of reception data to the recording apparatus 200 performed by the IP telephone 100 are regarded as one pair, and the pair of the first outputs is referred to as a Q1. Similarly, a pair of second outputs is referred to as a Q2, and hereinafter, a pair of n-th outputs is referred to as a Qn. The communication data in the Q1 corresponds to the communication data in the P1. Similarly, the communication data in the Q2 corresponds to the communication data in the P2. Similarly, the communication data in the Qn hereinafter corresponds to the communication data in the Pn.

In FIG. 4, when the IP telephone 100 has received the response signal from the recording apparatus 200, it has stored the communication data of the P1 to the P5. After a communication session with the recording apparatus 200 is established, the IP telephone 100 successively outputs the stored communication data to the recording apparatus 200. When the IP telephone 100 outputs the communication data, the duration d21 is shorter than the duration d11. Similarly, the duration d22 is shorter than the duration d12. Accordingly, the communication data stored in the memory 110 is gradually reduced. Specifically, for example, when the duration d11 and the duration d12 are each 40 milliseconds and the duration d21 and the duration d22 are each 20 milliseconds, the IP telephone 100 outputs the stored communication data to the recording apparatus 200 in a cycle shorter than that when it transmits and receives call data to and from the call-destination telephone 800.

In the example of FIG. 4, the IP telephone 100 outputs communication data from the Q1 to the Qn that corresponds to the Pn to the recording apparatus 200 in the duration d21 and the duration d22. Then, the IP telephone 100 outputs the communication data of the Qn+1 corresponding to the communication data of the Pn+1 to the recording apparatus 200 in the duration d11 and the duration d12. The processing for switching a duration for outputting communication data as described above will be described later.

Next, details of the processing performed by the IP telephone 100 is described with reference to FIGS. 5 to 8.

Figure 5:
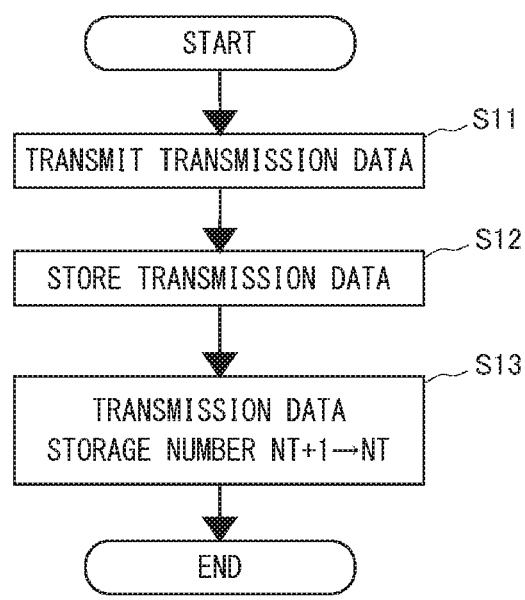
FIG. 5 is a flowchart showing processing for recording transmission data of the IP telephone according to the example embodiment.

FIG. 5 is a flowchart showing processing for recording transmission data of the IP telephone according to the example embodiment. When a communication session with the call-destination telephone 800 has been established, the IP telephone 100 starts the processing shown in FIG. 5.

First, the control unit 120 transmits transmission data to the call-destination telephone 800 (Step S11). This processing corresponds to the processing in Steps S104 and S106 in FIG. 4.

Next, the control unit 120 stores the transmission data in the memory 110 (Step S12). This processing corresponds to the processing in Steps S111 and S113 in FIG. 4.

Next, the control unit 120 counts up a transmission data storage number NT (Step S13). That is, the control unit 120 stores the transmission data storage number NT by adding one thereto. When the control unit 120 has counted up the transmission data storage number, the processing ends. The control unit 120 performs this processing in each of the durations d11, and counts up transmission data storage number NT each time it performs this processing. Note that the transmission data storage number NT is zero when a communication session with the call-destination telephone 800 has been established.

Figure 6:
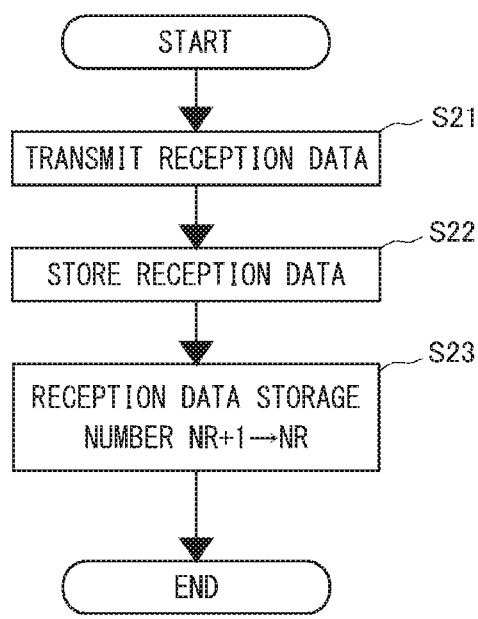
FIG. 6 is a flowchart showing processing for recording reception data of the IP telephone according to the example embodiment.

FIG. 6 is a flowchart showing processing for recording reception data of the IP telephone according to the example embodiment. When a communication session with the call-destination telephone 800 has been established, the IP telephone 100 starts the processing shown in FIG. 6.

First, the control unit 120 receives reception data from the call-destination telephone 800 (Step S21). This processing corresponds to the processing in Steps S105 and S107 in FIG. 4.

Next, the control unit 120 stores the reception data in the memory 110 (Step S22). This processing corresponds to the processing in Steps S112 and S114 in FIG. 4.

Next, the control unit 120 counts up a reception data storage number NR (Step S23). That is, the control unit 120 stores the reception data storage number NR by adding 1 thereto. When the control unit 120 has counted up the reception data storage number, the processing ends. The control unit 120 performs this processing in each of the durations d12, and counts up reception data storage number NR each time it performs this processing. Note that the reception data storage number NR is zero when a communication session with the call-destination telephone 800 has been established.

Figure 7:
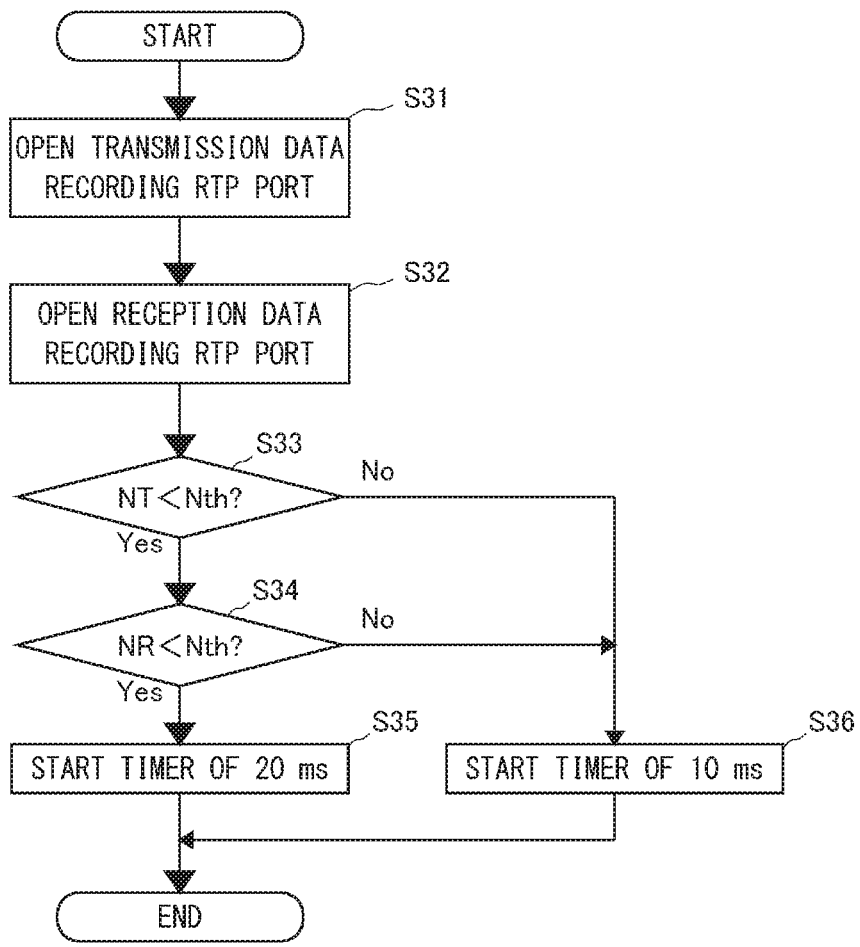
FIG. 7 is a flowchart showing processing for starting a timer of the IP telephone according to the example embodiment.

Next, processing for determining the length of a duration in which the IP telephone 100 outputs communication data to the recording apparatus 200 is described with reference to FIG. 7. As shown in Steps S201 to S204 etc., of FIG. 4, the IP telephone 100 outputs the communication data stored in the memory 110 when a communication session with the recording apparatus 200 has been established by receiving a response signal from the recording apparatus 200. Further, as described above, the IP telephone 100 determines durations (the d21 and the d22 in FIG. 4) in which it outputs communication data to the recording apparatus 200 in accordance with the data amount of communication data that is stored in the memory 110 and is not output to the recording apparatus 200. FIG. 7 is a flowchart showing processing for starting a timer of the IP telephone according to the example embodiment. When a communication session with the recording apparatus 200 has been established, the IP telephone 100 starts the processing shown in FIG. 7.

First, the control unit 120 opens a transmission data recording RTP port in order to output the transmission data stored in the memory 110 to the recording apparatus 200 (Step S31).

Similarly, the control unit 120 opens a reception data recording RTP port in order to output the reception data stored in the memory 110 to the recording apparatus 200 (Step S32).

Next, the control unit 120 determines whether a value of the transmission data storage number NT that has been described with reference to FIG. 5 is smaller than a predetermined threshold Nth (Step S33).

When the control unit 120 does not determine that the value of the transmission data storage number NT is smaller than the threshold Nth (Step S33: No), the value of the transmission data storage number NT is equal to or greater than the threshold Nth. In this case, the control unit 120 sets a timer to output transmission data every 10 milliseconds, which is an interval shorter than that in the case where the value of transmission data storage number NT is smaller than the threshold Nth (Step S36).

On the other hand, when the control unit 120 determines that the value of the transmission data storage number NT is smaller than the threshold Nth (Step S33: Yes), the control unit 120 determines whether the value of the reception data storage number NR that has been described with reference to FIG. 6 is smaller than the predetermined threshold Nth (Step S34).

When the control unit 120 does not determine that the value of the reception data storage number NR is smaller than the threshold Nth (Step S34: No), the value of the reception data storage number NR is equal to or greater than the threshold Nth. In this case, the control unit 120 sets a timer to output transmission data every 10 milliseconds which is an interval shorter than that in the case where the value of reception data storage number NR is smaller than the threshold Nth (Step S36). That is, when the control unit 120 determines that one of the value of the transmission data storage number NT and the value of the reception data storage number NR is equal to or greater than the threshold Nth, it sets a timer so as to output transmission data every 10 milliseconds.

On the other hand, when the control unit 120 determines that the value of the transmission data storage number NT is smaller than the threshold Nth (Step S33: Yes), it sets a timer to output transmission data every 20 milliseconds which is an interval longer than that in the case where the value of transmission data storage number NT is equal to or greater than the threshold Nth (Step S35). That is, when the control unit 120 determines that the values of the transmission data storage number NT and the reception data storage number NR are both smaller than the threshold Nth, it sets a timer so as to output transmission data every 20 milliseconds.

When the control unit 120 sets the time of the timer, the IP telephone 100 terminates the processing for determining the length of the duration in which it outputs communication data to the recording apparatus 200.

As described above, the IP telephone 100 outputs communication data stored in the memory 110 to the recording apparatus 200 in a cycle shorter than that when it transmits and receives call data to and from the call-destination telephone 800. This makes it possible to reduce the delay of the processing in which the IP telephone 100 outputs communication data to the recording apparatus 200 with respect to the processing in which the IP telephone 100 transmits and receives communication data.

Further, the IP telephone 100 determines, in accordance with the data amount of communication data that is stored in the memory 110 and is not output to the recording apparatus 200, a cycle in which the IP telephone 100 outputs the communication data to the recording apparatus 200. This makes it possible to shorten the delay of the processing in which the IP telephone 100 outputs communication data to the recording apparatus 200.

Figure 8:
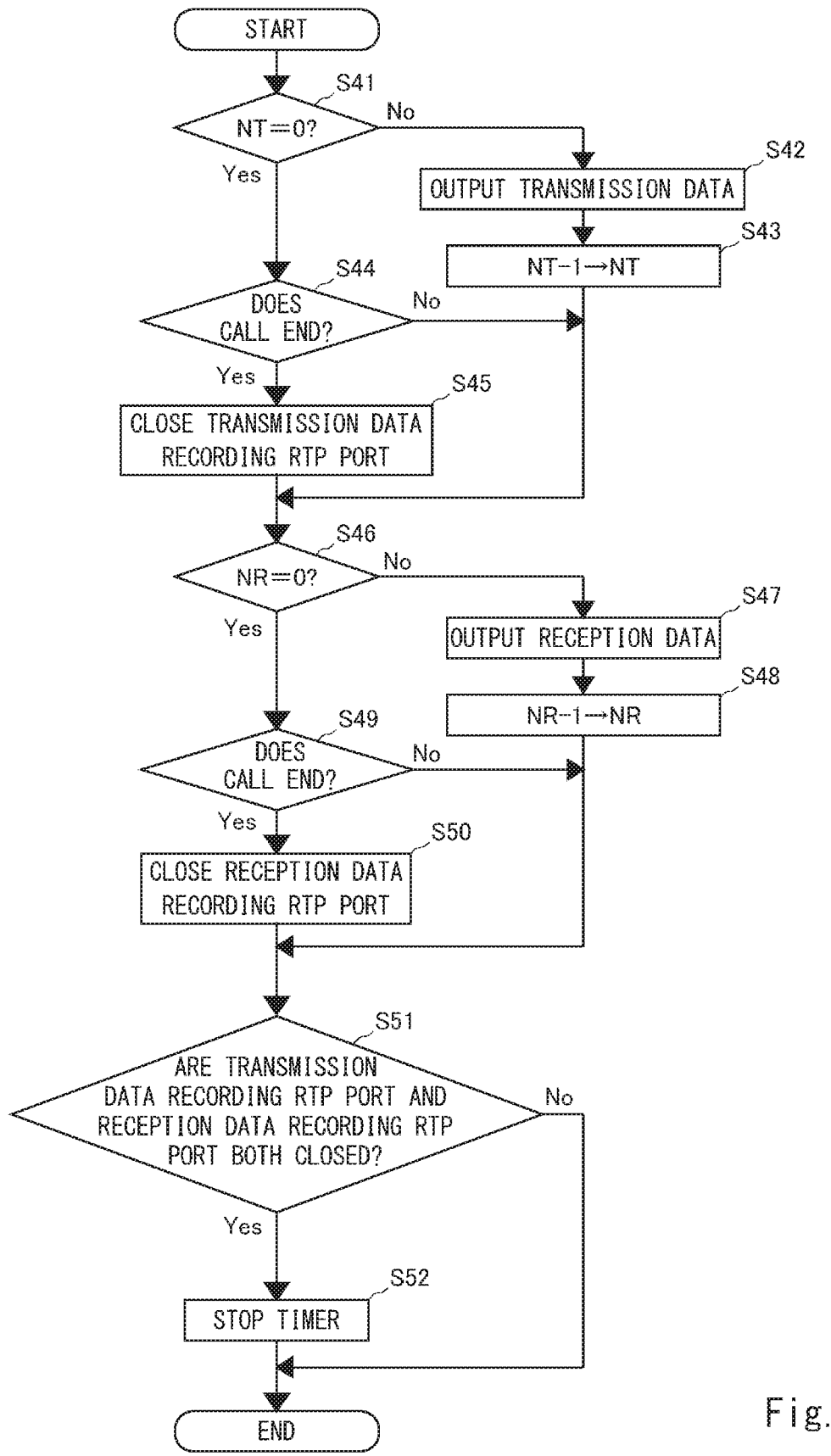
FIG. 8 is a flowchart showing processing for stopping a timer of the IP telephone according to the example embodiment.

Next, processing for stopping a timer is described with reference to FIG. 8. FIG. 8 is a flowchart showing the processing for stopping a timer of the IP telephone according to the example embodiment. The control unit 120 outputs, after starting a timer in the processing shown in FIG. 7, communication data to the recording apparatus 200 and performs the processing shown in FIG. 8.

First, the control unit 120 determines whether the transmission data storage number NT is zero (Step S41). When the control unit 120 does not determine that the transmission data storage number NT is zero (Step S41: No), it outputs transmission data to be stored in the memory 110 to the recording apparatus 200 (Step S42). Further, when the control unit 120 outputs the transmission data, it counts down the transmission data storage number NT by one (Step S43). The control unit 120 terminates, after counting down the transmission data storage number NT by one, the processing related to the transmission data, and proceeds to Step S46 which is the processing related to the reception data.

On the other hand, when the control unit 120 determines that the transmission data storage number NT is zero (Step S41: Yes), it determines whether a call ends (Step S44). When the control unit 120 determines that the call does not end (Step S44: No), it terminates the processing related to the transmission data, and proceeds to Step S46 which is the processing related to the reception data.

On the other hand, when the control unit 120 determines that the call ends (Step S44: Yes), it closes the transmission data recording RTP port (Step S45). The control unit 120 terminates, after closing the transmission data recording RTP port, the processing related to the transmission data and proceeds to Step S46 which is the processing related to the reception data.

First, the control unit 120 determines whether the reception data storage number NR is zero (Step S46). When the control unit 120 does not determine that the reception data storage number NR is zero (Step S46: No), it outputs reception data to be stored in the memory 110 to the recording apparatus 200 (Step S47). Further, when the control unit 120 outputs the reception data, it counts down the reception data storage number NR by one (Step S48). The control unit 120 terminates, after counting down the reception data storage number NR by one, the processing related to the reception data, and proceeds to Step S51.

On the other hand, when the control unit 120 determines that the reception data storage number NR is zero (Step S46: Yes), it determines whether a call ends (Step S49). When the control unit 120 determines that the call does not end (Step S49: No), it terminates the processing related to the reception data, and proceeds to Step S51.

On the other hand, when the control unit 120 determines that the call ends (Step S49: Yes), it closes the reception data recording RTP port (Step S50). The control unit 120 terminates, after closing the reception data recording RTP port, the processing related to the reception data and proceeds to Step S51.

Next, the control unit 120 determines whether the transmission data recording RTP port and the reception data recording RTP port are both closed (Step S51).

When the control unit 120 does not determine that the transmission data recording RTP port and the reception data recording RTP port are both closed (Step S51: No), one of the transmission data recording RTP port and the reception data recording RTP port or both are open. In order to continuously output the communication data, the control unit 120 terminates the processing without stopping a timer. When the processing for outputting the communication data shown in FIG. 8 is terminated without stopping the timer, the IP telephone 100 repeats the processing for outputting communication data shown in FIG. 8 based on the duration of the timer determined by the processing shown in FIG. 7.

On the other hand, when the control unit 120 determines that the transmission data recording RTP port and the reception data recording RTP port are both closed (Step S51: Yes), the call between the IP telephone 100 and the call-destination telephone 800 has ended and all the communication data has been output to the recording apparatus 200. In this case, the control unit 120 stops the timer (Step S52). The control unit 120 terminates, after stopping the timer, the processing for outputting communication data.

Returning to FIG. 4, a specific example of the processing shown in FIG. 8 is described. In FIG. 4, the IP telephone 100 outputs, after outputting the transmission data of the Qn−1 corresponding to the transmission data of the Pn−1, the transmission data of the Qn corresponding to the transmission data of the Pn when the duration d21 that is shorter than the duration d11 has elapsed. Further, the IP telephone 100 outputs, after outputting the reception data of the Qn−1 corresponding to the reception data of the Pn−1, the reception data of the Qn corresponding to the reception data of the Pn when the duration d22 that is shorter than the duration d12 has elapsed. At this time, in the memory 110, there is no communication data to be output for each of the durations (d21 and d22) based on the timer, and the transmission data storage number NT and the reception data storage number NR are both zero. Therefore, the IP telephone 100 does not output the transmission data and the reception data at the time when the durations d21 and d22 have elapsed after the outputting of the transmission data of the Qn and the reception data of the Qn. Then, the IP telephone 100 outputs the transmission data of the Qn+1 and the reception data of the Qn+1 which are stored in the memory 110 at the time when the durations d21 and d22 have again elapsed. After that, the IP telephone 100 successively outputs the transmission data and the reception data which are the communication data stored in the memory 110 to the recording apparatus 200. The IP telephone 100 continues the above-described processing until the call ends.

With the above-described configuration, the IP telephone 100 according to the example embodiment can provide an IP telephone call recording system capable of preventing a loss of the beginning part of a talk while preventing the occurrence of missing data due to outputting communication data in a cycle faster than that when call data is transmitted and received to and from the call-destination telephone 800.

Note that in FIG. 8, although the processing for determining whether the transmission data storage number NT or the reception data storage number NR is zero is described, they do not need to be zero and may be 1 or 2 as long as they are predetermined values.

Note that the present invention is not limited to the above-described example embodiments and they can be modified as appropriate without departing from the spirit of the invention. For example, communication data may include data of an image taken by a camera in addition to transmission data and reception data. Further, the communication data may include only the transmission data or only the reception data. Further, in the IP telephone recording system 1 that has been described with reference to FIG. 3, a plurality of IP telephones may be connected to one recording apparatus.

For example, the whole or part of the example embodiments disclosed above can be described as, but not limited to, the following supplementary notes.

(Supplementary Note 1)

A communication apparatus comprising:

a memory configured to store communication data with a communication destination; and a control unit configured to transmit and receive the communication data to and from the communication destination in each first duration and store the transmitted and received communication data in the memory, then output, after a communication session with an external recording apparatus that records the communication data is established, the communication data stored in the memory to the external recording apparatus in each second duration that is shorter than the first duration.

(Supplementary Note 2)

The communication apparatus described in Supplementary note 1, wherein the control unit outputs, after a communication session with the communication destination is established, a request signal for establishing a communication session to the external recording apparatus.

(Supplementary Note 3)

The communication apparatus described in Supplementary note 1 or 2, wherein the control unit determines a length of a second duration after receiving, from the external recording apparatus, a response signal to the request signal output for establishing the communication session with the external recording apparatus.

(Supplementary Note 4)

The communication apparatus described in any one of Supplementary notes 1 to 3, wherein the control unit determines the length of the second duration in accordance with a data amount of the communication data that is stored in the memory and is not output to the external recording apparatus.

(Supplementary Note 5)

The communication apparatus described in Supplementary note 4, wherein the control unit determines the length of the second duration in accordance with the data amount at the time when the communication session with the external recording apparatus is established.

(Supplementary Note 6)

The communication apparatus described in any one of Supplementary notes 1 to 5, wherein the communication data comprises transmission data of a voice uttered by a user in the first duration and reception data that is received from the communication destination.

(Supplementary Note 7)

A communication data recording system comprising:

the communication apparatus described in any one of Supplementary notes 1 to 6; and a recording apparatus configured to communicably connect to the communication apparatus and record the communication data output from the communication apparatus.

(Supplementary Note 8)

A communication method comprising:

transmitting and receiving communication data to and from a communication destination in each first duration;

storing the transmitted and received communication data in a memory;

establishing a communication session with an external recording apparatus that records the communication data; and outputting, after a communication session with the external recording apparatus is established, the communication data stored in the memory to the external recording apparatus in each second duration that is shorter than the first duration.

(Supplementary Note 9)

The communication method described in Supplementary note 8, wherein a request signal for establishing a communication session is output to the external recording apparatus after a communication session with the communication destination is established.

(Supplementary Note 10)

The communication method described in Supplementary note 9, wherein the length of the second duration is determined after a response signal to the request signal output for establishing the communication session with the external recording apparatus is received from the external recording apparatus.

(Supplementary Note 11)

The communication method described in any one of Supplementary notes 8 to 10, wherein the length of the second duration is determined in accordance with the data amount of the communication data that is stored in the memory and is not output to the external recording apparatus.

(Supplementary Note 12)

The communication method described in Supplementary note 11, wherein the length of the second duration is determined in accordance with the data amount at the time when the communication session with the external recording apparatus is established.

(Supplementary Note 13)

A program for causing a computer to execute a communication method for outputting communication data with a communication destination to an external recording apparatus, the communication method comprising:

transmitting and receiving communication data to and from a communication destination in each first duration;

storing the transmitted and received communication data in a memory;

establishing a communication session with an external recording apparatus that records the communication data; and outputting, after a communication session with the external recording apparatus is established, the communication data stored in the memory to the external recording apparatus in each second duration that is shorter than the first duration.

(Supplementary Note 14)

The program described in Supplementary note 13, wherein a request signal for establishing a communication session is output to the external recording apparatus after a communication session with the communication destination is established.

(Supplementary Note 15)

The program described in Supplementary note 13 or 14, wherein the length of the second duration is determined after a response signal to the request signal output for establishing the communication session with the external recording apparatus is received from the external recording apparatus.

(Supplementary Note 16)

The program described in any one of Supplementary notes 13 to 15, wherein the length of the second duration is determined in accordance with the data amount of the communication data that is stored in the memory and is not output to the external recording apparatus.

(Supplementary Note 17)

The program described in Supplementary note 16, wherein the length of the second duration is determined in accordance with the data amount at the time when the communication session with the external recording apparatus is established.

The present invention has been explained above with reference to the example embodiments. However, the present invention is not limited to the aforementioned example embodiments. Various changes that can be understood by those skilled in the art can be made to the configuration and the details of the present invention without departing from the scope of the invention.

Although the present invention is described as a hardware configuration in the above example embodiments, the present invention is not limited thereto. In the present invention, predetermined processing can be achieved by causing a Central Processing Unit (CPU) to execute a computer program. Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), Compact Disc Recordable (CD-R), Compact Disc ReWritable (CD-R/W), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

REFERENCE SIGNS LIST

1 TELEPHONE RECORDING SYSTEM
100 IP TELEPHONE
110 MEMORY
120 CONTROL UNIT
130 MICROPHONE
131 SPEAKER
132 SIGNAL CONVERSION UNIT
133 OPERATION UNIT
134 DISPLAY UNIT
135 WAN INTERFACE
136 LAN INTERFACE
200 RECORDING APPARATUS
300 GATEWAY
700 SERVER
800 CALL-DESTINATION TELEPHONE
900 INTERNET NETWORK

The invention claimed is:

1. A communication apparatus connected to an external recording apparatus and an Internet Protocol (IP) network using an IP communication technology, and configured to communicate with a communication destination using a Voice over Internet Protocol (VOIP) technology and store communication data with the communication destination, the communication data being payloads corresponding to a predetermined time transmitted as packets, in the external recording apparatus, the communication apparatus comprising:
a memory configured to store the communication data with the communication destination; and
a control unit configured to:
transmit and receive the communication data to and from the communication destination in each first duration;
store the transmitted and received communication data in the memory; and
output, after a communication session with the external recording apparatus that is configured to record the communication data is established, the communication data stored in the memory to the external recording apparatus in each second duration that is shorter than the first duration,
wherein the control unit is further configured to output, after the communication session with the communication destination is established and before transmission data is transmitted to the communication destination, a request signal for establishing a communication session to the external recording apparatus.

2. The communication apparatus according to claim 1, wherein the control unit is configured to determine a length of a second duration after receiving, from the external recording apparatus, a response signal to the request signal output for establishing the communication session with the external recording apparatus.

3. The communication apparatus according to claim 1, wherein the control unit is configured to determine the length of the second duration in accordance with a data amount of the communication data that is stored in the memory and is not output to the external recording apparatus.

4. The communication apparatus according to claim 3, wherein the control unit is configured to determine the length of the second duration in accordance with the data amount at the time when the communication session with the external recording apparatus is established.

5. The communication apparatus according to claim 1, wherein the communication data comprises transmission data of a voice uttered by a user in the first duration and reception data that is received from the communication destination.

6. A communication data recording system comprising:
the communication apparatus according to claim 1; and
a recording apparatus configured to communicably connect to the communication apparatus using an IP communication technology and record the communication data output from the communication apparatus.

7. A communication method for recording communication data with a communication destination that performs communication using a Voice over Internet Protocol (VOIP) technology and storing the communication data being payloads corresponding to a predetermined time transmitted as packets, in an external recording apparatus, the external recording apparatus being connected to a communication apparatus using an Internet Protocol (IP) communication technology, the communication method comprising:
after a communication session with the communication destination is established
transmitting and receiving the communication data to and from the communication destination in each first duration and storing the transmitted and received communication data in a memory; and
establishing a communication session with the external recording apparatus that records the communication data by outputting a request signal for establishing the communication session to the external recording apparatus; and
outputting, after the communication session with the external recording apparatus is established and before transmission data is transmitted to the communication destination, the communication data stored in the memory to the external recording apparatus in each second duration that is shorter than the first duration.

8. The communication method according to claim 7, wherein the length of the second duration is determined after a response signal to the request signal output for establishing the communication session with the external recording apparatus is received from the external recording apparatus.

9. The communication method according to claim 7, wherein the length of the second duration is determined in accordance with the data amount of the communication data that is stored in the memory and is not output to the external recording apparatus.

10. The communication method according to claim 9, wherein the length of the second duration is determined in accordance with the data amount at the time when the communication session with the external recording apparatus is established.

11. The communication method according to claim 8, wherein the communication data comprises transmission data of a voice uttered by a user in the first duration and reception data that is received from the communication destination.

12. A non-transitory computer readable storage medium storing a program for causing a computer to execute a communication method for recording communication data with a communication destination that performs communication using a Voice over Internet Protocol (VOIP) technology and storing the communication data being payloads corresponding to a predetermined time transmitted as packets, in an external recording apparatus, the external recording apparatus being connected to a communication apparatus using an Internet Protocol (IP) communication technology, the communication method comprising:

after a communication session with the communication destination is established,
transmitting and receiving the communication data to and from the communication destination in each first duration and storing the transmitted and received communication data in a memory; and establishing a communication session with the external recording apparatus that records the communication data by outputting a request signal for establishing the communication session to the external recording apparatus; and outputting, after the communication session with the external recording apparatus is established and before transmission data is transmitted to the communication destination, the communication data stored in the memory to the external recording apparatus in each second duration that is shorter than the first duration.

13. The non-transitory computer readable storage medium storing the program according to claim 12, wherein the length of the second duration is determined after a response signal to the request signal output for establishing the communication session with the external recording apparatus is received from the external recording apparatus.

14. The non-transitory computer readable storage medium storing the program according to claim 12, wherein the length of the second duration is determined in accordance with the data amount of the communication data that is stored in the memory and is not output to the external recording apparatus.

15. The non-transitory computer readable storage medium storing the program according to claim 14, wherein the length of the second duration is determined in accordance with the data amount at the time when the communication session with the external recording apparatus is established.

16. The non-transitory computer readable storage medium storing the program according to claim 12, wherein the communication data comprises transmission data of a voice uttered by a user in the first duration and reception data that is received from the communication destination.

* * * * *